Patented Jan. 26, 1932

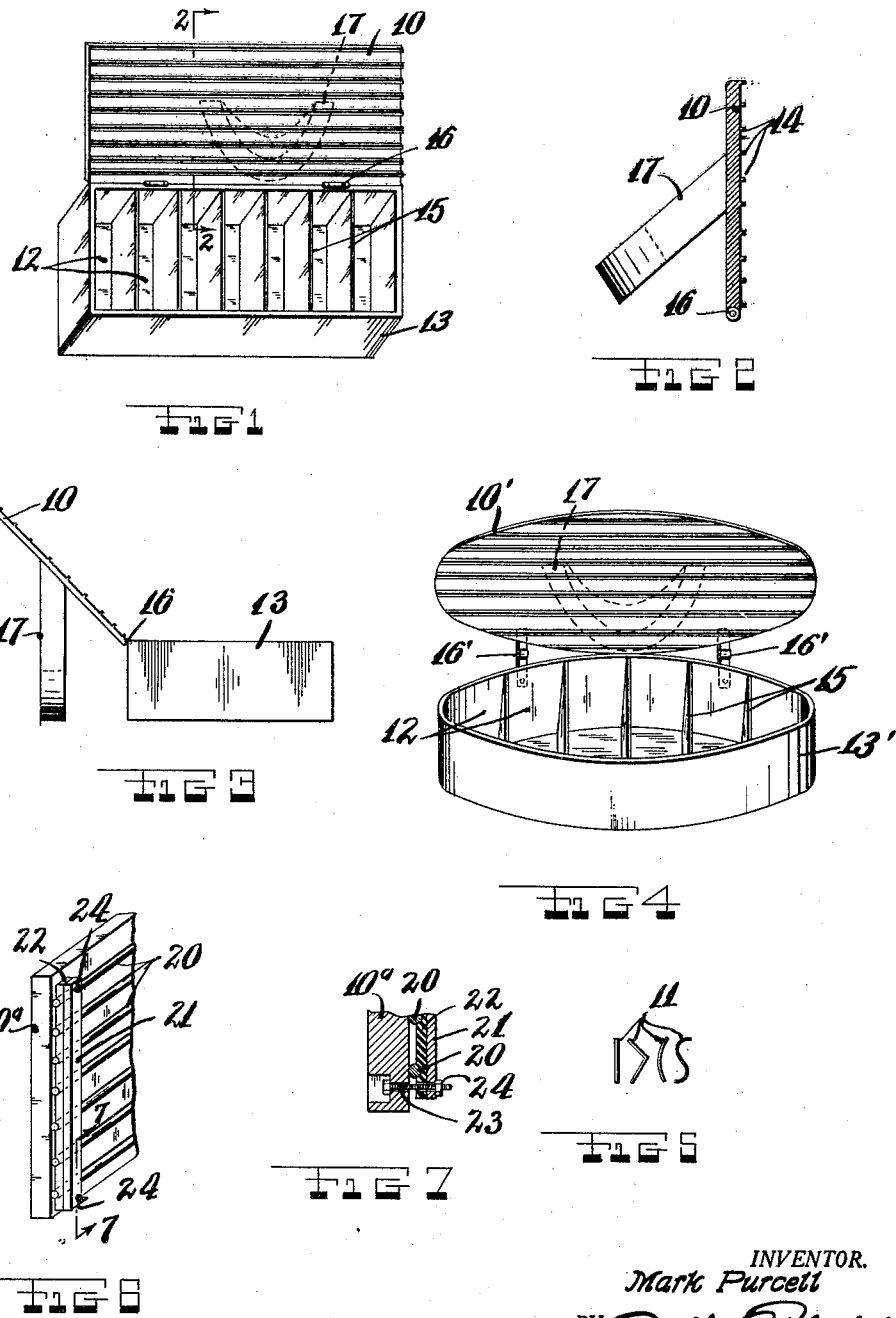

1,842,881

UNITED STATES PATENT OFFICE

MARK PURCELL, OF BROOKLYN, NEW YORK

MAGNETIC TOY

Application filed February 5, 1930. Serial No. 425,924.

This invention relates to new and useful improvements in a magnetic toy.

The invention has for an object the provision of a device of the class mentioned which is of simple durable construction dependable in use and efficient in action, and which can be manufactured and sold at a reasonable cost.

The invention proposes a magnetic board for holding various shaped magnetizable objects normally assorted in several compartments of a container connected with the board, in stationary positions as manually placed on said board when the latter element is in an inclined position, and a plurality of horizontal ridges projecting from said magnetic board for preventing said objects from sliding down the incline under the force of gravity. It is also proposed to provide rods to constitute substitutes for said ridges and means for adjustably holding the rods in various spaced positions.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a perspective view of a device constructed according to this invention.

Fig. 2 is a fragmentary sectional view taken on the line 2—2 of Fig. 1.

Fig. 3 is an end elevational view of Fig. 1.

Fig. 4 is a view similar to Fig. 1 but illustrating a modified form of the device.

Fig. 5 illustrates several of the magnetized objects.

Fig. 6 is a fragmentary vertical sectional view of a magnetic board constructed according to modified form.

Fig. 7 is an enlarged fragmentary vertical sectional view taken on the line 7—7 of Fig 6.

The magnetic toy consists of a magnetic board 10 for holding various shaped magnetizable objects 11 normally assorted in several compartments 12 of a container 13 connected with said board, in stationary positions as manually placed on said board when the latter element is in an inclined position, and a plurality of horizontal ridges 14 projecting from said magnetic board for preventing said objects from sliding down the incline under the force of gravity.

The container 13 illustrated in Fig. 1 is rectangular in horizontal cross section and is formed with a plurality of partitions 15 for dividing the container into the said compartments 12. It is opened at the top and the magnetic board 10 is hingedly connected at one edge 16 upon one side of the container and also constitutes a cover for closing the latter element.

A means is provided for maintaining the magnetic board 10 in magnetized condition. A permanent magnet 17 is attached upon the outer face of the board 10 and is arranged at an inclination as shown in Figs. 2 and 3. This magnet in addition to providing the magnetism for the board also acts as a foot for supporting the board in the inclined position before mentioned. This is clearly shown in Fig. 3 where the magnet 17 is shown resting upon the same surface that the container rests on and holds the magnetic board at an inclination. The inclination is desired in that the various objects 11 may be conveniently arranged upon the top surface.

In the modified form of the device illustrated in Fig. 4, a container 13' has been shown which is of elliptical shape in horizontal cross section. This container is provided with a plurality of partitions 15 dividing the same into compartments 12 for normally holding the objects 11 in some assorted arrangement. This container is provided with a magnet board 10' hingedly connected as at 16' upon one side of the container 13 so as to act as a cover for the container. A magnet 17 is attached upon the outer face of the board 10' and at an inclination as described relative to the previous form for the same purpose.

The group of objects 11 shown in Fig. 5 consist mainly in bent iron wires. Some of these wires are curved and others are formed with straight parts. While only a few shapes have been shown, it must be remembered that numerous others may also be supplied. These various objects may be arranged close together so as to form various symbols, letters, pictures and the like. The object of the game is to arrange these members 11 upon the magnetic board in different fashions and arrangements to produce different pictures, words, letters and the like and thus provide amusement for a child.

In Figs. 6 and 7, a modified means has been illustrated for preventing the sliding of the various objects from the board under the force of gravity. This means consists of a plurality of rods 20 horizontally arranged upon the top surface of a magnetic board 10ª, and means for holding these rods in various adjusted spaced positions. The latter means consists of a vertical strip 21 provided with an inner soft rubber layer 22 and resting against the rods 20. Studs 23 project from the magnetic board and pass thru apertures in the vertical strip, and a nut 24 threadedly engages upon each of the studs and serves to clamp the strips firmly against the rods. Should the particular construction of the various magnetizable objects 11 be such that it is desirable to differently space the supporting rods 20, it is merely necessary to loosen the nuts 24 and manually move the rods into the new positions and then tighten the nuts for maintaining the adjusted position.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A magnetic toy, comprising a magnetic board for holding various shaped magnetizable objects in stationary positions as placed on said board when the latter element is in an inclined position, and a plurality of horizontal ridges projecting from said magnetic board for preventing said objects from sliding down the incline under the force of gravity, a plurality of rods being attached upon the magnetic board and constituting the said horizontal ridges, and means for holding said rods in various spaced positions, said means comprising a vertical strip provided with an inner resilient layer for resting against said rods, and means for adjusting the tension of the strip against the rods.

2. A magnetic toy, comprising a magnetic board for holding various shaped magnetizable objects in stationary positions as placed on said board when the latter element is in an inclined position, and a plurality of horizontal ridges projecting from said magnetic board for preventing said objects from sliding down the incline under the force of gravity, a plurality of rods being attached upon the magnetic board and constituting the said horizontal ridges, and means for holding said rods in various spaced positions, said means comprising a vertical strip provided with an inner resilient layer for resting against said rods, and means for adjusting the tension of the strip against the rods, said means comprising studs projecting from said board into apertures in said vertical strip, and nuts engaged upon said studs.

3. A magnetic toy, comprising a magnetic board for holding various shaped magnetizable objects in stationary positions as placed on said board when the latter element is in an inclined position, and a plurality of horizontal ridges projecting from said magnetic board for preventing said objects from sliding down the incline under the force of gravity, a plurality of rods being attached upon the magnetic board and constituting the said horizontal ridges, and means for holding said rods in various spaced positions, said means comprising a vertical strip provided with an inner resilient layer for resting against said rods, and means for adjusting the tension of the strip against the rods, said means comprising studs projecting from said board into apertures in said vertical strip, and means engaging upon said studs for bearing against said vertical strip.

In testimony whereof I have affixed my signature.

MARK PURCELL.